(12) United States Patent
Lim et al.

(10) Patent No.: US 12,483,061 B2
(45) Date of Patent: Nov. 25, 2025

(54) BATTERY PACK

(71) Applicant: SAMSUNG SDI CO., LTD., Yongin-si (KR)

(72) Inventors: Hyunghoon Lim, Yongin-si (KR); Sungkoo Kang, Yongin-si (KR); Jisu Kim, Yongin-si (KR); Junhyung Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 101 days.

(21) Appl. No.: 18/385,030

(22) Filed: Oct. 30, 2023

(65) Prior Publication Data

US 2024/0322595 A1   Sep. 26, 2024

(30) Foreign Application Priority Data

Mar. 21, 2023   (KR) .......................... 10-2023-0036702

(51) Int. Cl.
    *H02J 9/06*   (2006.01)
(52) U.S. Cl.
    CPC .................................. *H02J 9/061* (2013.01)
(58) Field of Classification Search
    CPC ...... H02J 9/061; H02J 2207/10; H02J 7/0063; H02J 2207/20; H02J 9/06; H02J 7/342; H01M 10/425; H01M 10/4257; H01M 10/44; Y02E 60/10; G01R 15/04
    USPC .......................................................... 307/19
    See application file for complete search history.

(56) References Cited

U.S. PATENT DOCUMENTS

| 5,610,450 A | * | 3/1997 | Saeki ........................ G05F 1/56 |
| | | | 363/101 |
| 9,077,196 B2 | | 7/2015 | Sim et al. |
| 2016/0164328 A1 | | 6/2016 | Kim |

FOREIGN PATENT DOCUMENTS

| EP | 2 587 618 A2 | 5/2013 |
| EP | 3 247 022 A1 | 11/2017 |
| KR | 10-1594925 B1 | 2/2016 |
| KR | 10-1905075 B1 | 9/2018 |

OTHER PUBLICATIONS

Extended European Search Report dated Nov. 12, 2024, for corresponding EP Patent Application No. 24150807.6.

* cited by examiner

*Primary Examiner* — Richard Tan
(74) *Attorney, Agent, or Firm* — Lee IP Law, P.C.

(57) ABSTRACT

A battery pack includes a battery including at least one battery cell, a DC/DC converter configured to generate first control power from battery power of the battery, an OR circuit configured to output control power having a higher voltage level from among second control power received from an external power supply device through a first external terminal and the first control power, a power supply circuit configured to generate driving power by using the control power received from the OR circuit, a control circuit driven by the driving power, and a first switch connected between an output terminal of the DC/DC converter and a second external terminal and controlled by the control circuit; the battery pack supplies the external control circuit with the control power generated by the DC/DC converter in the event of a power failure.

19 Claims, 2 Drawing Sheets

BATTERY PACK

CROSS-REFERENCE TO RELATED APPLICATION

This application claims priority to Korean Patent Application No. 10-2023-0036702, filed on Mar. 21, 2023, in the Korean Intellectual Property Office, the disclosure of which is incorporated by reference herein in its entirety.

BACKGROUND

1. Field

One or more embodiments relate to a battery pack, and more particularly, to a battery pack capable of supplying control power external to the battery pack if a power failure occurs.

2. Description of the Related Art

Direct current power is applied to electronic equipment that needs to always operate, such as communication devices, for stable operation. Battery systems are used to stably supply power to electronic equipment even if a power failure occurs or direct current power supply devices fail. Secondary batteries having electrical characteristics such as high energy density have been variously used in portable electronic devices, battery systems, electric vehicles (EVs), hybrid electric vehicles (HEVs), or the like in the form of battery packs.

SUMMARY

Embodiments are directed to a battery pack to which either a charger or a load can be connected, and can generate control power to control an external device if a power failure occurs.

One or more embodiments include a battery pack capable of supplying control power external to the battery pack if a power failure occurs.

Additional aspects will be set forth in part in the description which follows and, in part, will be apparent from the description, or may be learned by practice of the presented embodiments of the disclosure.

According to one or more embodiments, a battery pack includes a battery including at least one battery cell, a direct current (DC)/DC converter configured to generate first control power from battery power of the battery, an OR circuit configured to output control power having a higher voltage level from among the first control power received from an output terminal of the DC/DC converter and second control power received from an external power supply device through a first external terminal and the first control power, a power supply circuit configured to generate driving power by using the control power received from the OR circuit, a control circuit driven by the driving power, and a first switch connected between an output terminal of the DC/DC converter and a second external terminal of the battery pack; the first switch is controlled by the control circuit.

The control circuit may be further configured to detect a voltage level of the first external terminal and to short-circuit the first switch to output the first control power through the second external terminal in accordance with the voltage level of the first external terminal being less than or equal to a preset reference value.

The OR circuit may include a first node configured to output the control power to the power supply circuit, a second node configured to transmit the first control power to the second external terminal through the first switch, a first diode connected between the output terminal of the DC/DC converter and the first node, and a second diode connected between the first external terminal and the first node.

The battery pack may further include a third diode connected in series with the first switch between the second node and the second external terminal.

The OR circuit may further include a fourth diode connected between the second node and the first node.

The battery pack may further include a shunt resistor connected between the battery and a second pack terminal of the battery pack, where the shunt resistor has two ends, and an analog front end configured to detect a cell voltage of the at least one battery cell and a shunt resistor voltage at both ends of the shunt resistor and to transmit the detected cell voltage and voltage to the control circuit.

The battery pack may further include a second switch connected between a cathode of the battery and a first pack terminal of the battery pack, and a third switch connected between an anode of the battery and the second pack terminal. The control circuit may be further configured to control the second switch and the third switch based on at least one from among the cell voltage of the at least one battery cell and the shunt resistor voltage at both ends of the shunt resistor.

According to one or more additional embodiments, a device includes a battery, a first external terminal, and a second external terminal; a direct current (DC)/DC converter configured to generate first control power from battery power of the battery; a first control circuit configured to output control power having a higher voltage level from among the first control power received from an output terminal of the DC/DC converter and second control power received via the first external terminal; a power supply circuit configured to receive the control power output by the first control circuit and to generate driving power by using the control power; a second control circuit driven by the driving power; and a first switch connected between an output terminal of the DC/DC converter and the second external terminal.

The second control power may be received from an external power supply device.

The first switch may be controlled by the second control circuit. The second control circuit may be further configured to detect a voltage level of the first external terminal and to short-circuit the first switch to output the first control power through the second external terminal in accordance with the voltage level of the first external terminal being less than or equal to a preset reference value.

The second control circuit may also be configured to determine occurrence of a power failure, in accordance with the voltage level of the first external terminal being less than or equal to the preset reference value.

The first control circuit may further include a first node configured to output the control power to the power supply circuit; a second node configured to transmit the first control power to the second external terminal through the first switch; a first diode connected between the output terminal of the DC/DC converter and the first node; and a second diode connected between the first external terminal and the first node.

The device may also include a shunt resistor connected between the battery and a second pack terminal of the device, the shunt resistor having two ends; and an analog front end configured to detect a cell voltage of a battery cell of the battery and a shunt resistor voltage at both ends of the shunt resistor and to transmit the detected cell voltage and the shunt resistor voltage to the second control circuit.

The device may further include a second switch connected between a cathode of the battery and a first pack terminal of the device; and a third switch connected between an anode of the battery and the second pack terminal, wherein the control circuit is further configured to control the second switch and the third switch based on at least one from among the cell voltage of the at least one battery cell and the shunt resistor voltage.

According to one or more further embodiments, a device includes a battery, a first external terminal, and a second external terminal; a direct current (DC)/DC converter configured to generate first control power from battery power of the battery; a first control circuit configured to output control power having a higher voltage level from among the first control power received from an output terminal of the DC/DC converter and second control power received via the first external terminal; a power supply circuit configured to receive the control power output by the first control circuit and to generate driving power by using the control power; and a second control circuit driven by the driving circuit.

The second control power may be received from an external power supply device.

The device may also include a first switch connected between an output terminal of the DC/DC converter and the second external terminal; the second control circuit may be further configured to detect a voltage level of the first external terminal and to short-circuit the first switch to output the first control power through the second external terminal in accordance with the voltage level of the first external terminal being less than or equal to a preset reference. The first switch may be controlled by the second control circuit.

The first control circuit may include a first node configured to output the control power to the power supply circuit; a second node configured to transmit the first control power to the second external terminal through the first switch; a first diode connected between the output terminal of the DC/DC converter and the first node; and a second diode connected between the first external terminal and the first node.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
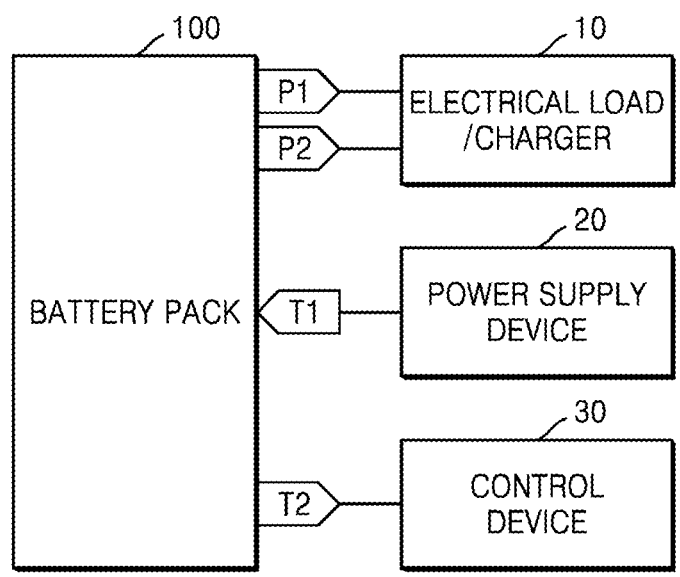
FIG. 1 illustrates a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprises", "comprising", "has", and/or "having" when used in this specification, specify the presence of stated features, integers, steps, operations, elements, and/or components, but do not preclude the presence or addition of one or more other features, integers, steps, operations, elements, components, and/or groups thereof. It will be understood that, although the terms first, second, etc. may be used herein to describe various elements or components, these elements or components should not be limited by these terms. These terms are only used to distinguish one element or component from another element component.

Hereinafter, embodiments will be more completely described with reference to the accompanying drawings illustrating embodiments. In the drawings, the same reference numerals denote the same or corresponding components, and thus their description will be omitted.

FIG. 1 illustrates a battery pack according to an embodiment.

Referring to FIG. 1, a battery pack 100 includes a first pack terminal P1, a second pack terminal P2, a first external terminal T1, and a second external terminal T2.

The battery pack 100 may be connected to an electrical load or charger 10 through the first and second pack terminals P1 and P2. In an implementation, the electrical load 10 is connected to the first and second pack terminals P1 and P2, and the battery pack 100 may supply power stored in a battery thereof (not shown) to the electrical load 10. Alternatively, the charger 10 is connected to the first and second pack terminals P1 and P2, and the battery inside the battery pack 100 may be charged with power supplied from the charger 10. The battery pack 100 includes a control circuit, i.e., a battery management system (BMS), which safely manages the internal battery. The control circuit may be implemented as a micro control unit (MCU).

The first external terminal T1 may be connected to a power supply device 20 that supplies control power for driving the control circuit inside the battery pack 100. The power supply device 20 may supply direct current power to the control circuit through the first external terminal T1. In addition, the control circuit inside the battery pack 100 may be driven by using power stored in the battery pack 100. To facilitate this, the battery pack 100 may include a direct current (DC)/DC converter that converts a battery voltage into a control voltage, and the DC/DC converter may generate control power by using power stored in the battery. The control power may be supplied to the control circuit.

The control power generated inside the battery pack 100 may be supplied to an external control device 30 through the second external terminal T2. The control device 30 may be connected to the second external terminal T2, and, in the event of a power failure, may perform a control operation by using the control power supplied from the battery pack 100. In an implementation, the control device 30 may be connected to the power supply device 20, and may receive the control power from the power supply device 20 in the absence of a power failure.

The battery pack 100 according to the disclosure may output the control power for driving the internal control circuit to an external device. Therefore, in the event of power failure, the battery pack 100 may supply the control power to the external control device 30 even without a separate uninterruptible power supply (UPS).

Figure 2:
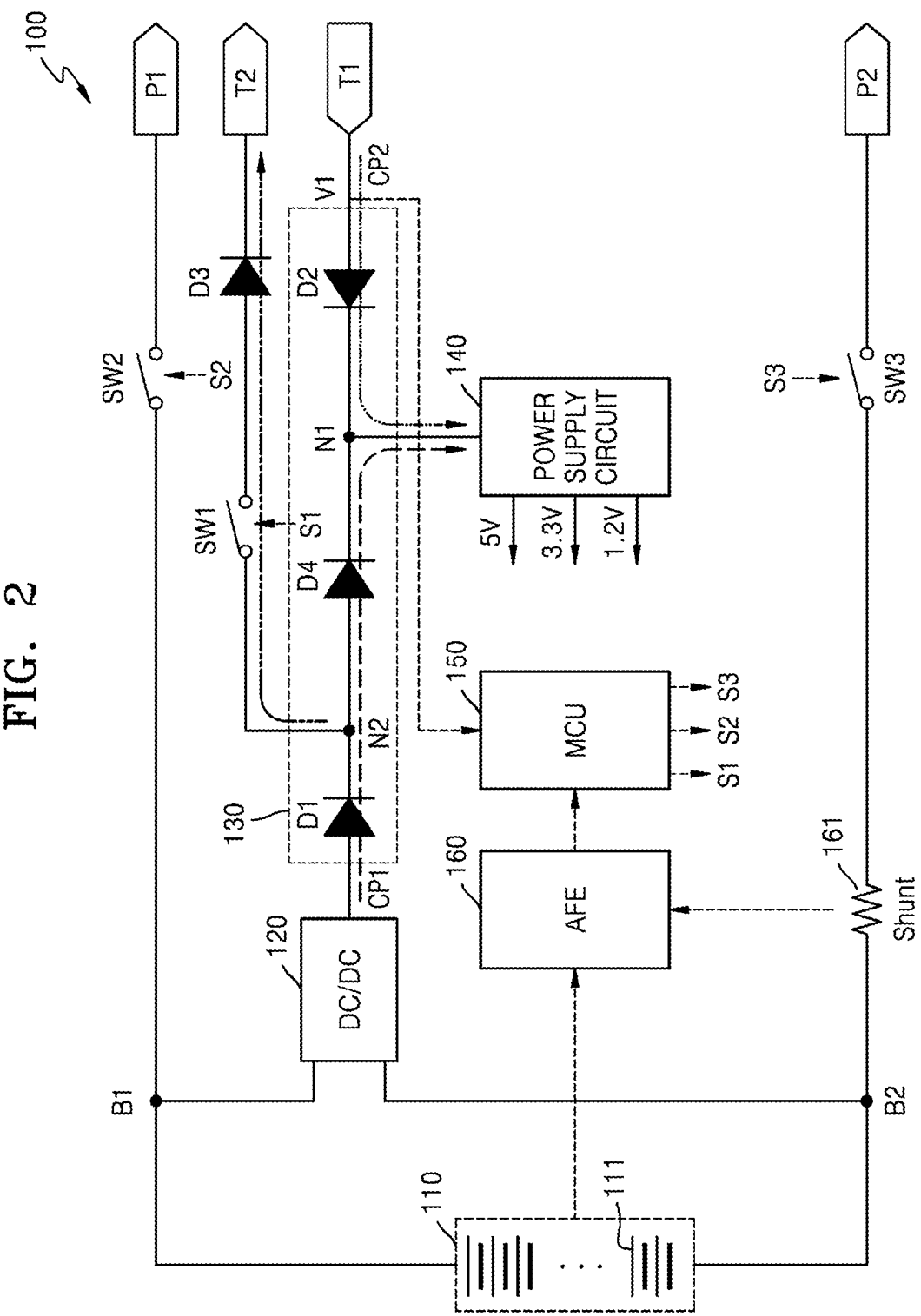
FIG. 2 illustrates an internal structure of a battery pack according to an embodiment.

FIG. 2 illustrates an internal structure of a battery pack according to an embodiment.

Referring to FIG. 2, a battery pack 100 includes a battery 110, a DC/DC converter 120, an OR circuit 130, a power supply circuit 140, a control circuit 150, and a first switch SW1. The battery pack 100 includes a first pack terminal P1, a second pack terminal P2, a first external terminal T1, and a second external terminal T2.

The battery 110 includes at least one battery cell 111. The battery cell 111 may be a portion for storing power and may include a rechargeable secondary battery. For example, the battery cell 111 may include one or more of a lithium ion battery, a lithium polymer battery, a nickel cadmium battery, a nickel metal hydride (Ni-MH) battery, a nickel zinc (Ni—Zn) battery, a lead storage battery, and the like. The number and connection structure of the battery cells 111 may be determined according to an output voltage and a charge/discharge capacity required for the battery pack 100.

The battery 110 may include first and second battery terminals B1 and B2, the first battery terminal B1 may be a cathode terminal of the battery 110, and the second battery terminal B2 may be an anode terminal of the battery 110.

The DC/DC converter 120 generates first control power CP1 from battery power of the battery 110. An input terminal of the DC/DC converter 120 may be connected to the first and second battery terminals B1 and B2 and receive the battery power of the battery 110. An output terminal of the DC/DC converter 120 may output the first control power CP1. The DC/DC converter 120 may be driven by a control voltage generated by the power supply circuit 140 and may be controlled by the control circuit 150. The first control power CP1 may have, for example, a direct current voltage of 24 V.

The OR circuit 130 may output control power having a higher voltage level, from among second control power CP2 received from the external power supply device 20 of FIG. 1 through the first external terminal T1 and the first control power CP1 generated by the DC/DC converter 120. The OR circuit 130 may include the output terminal of the DC/DC converter 120 and the first external terminal T1 as input terminals, and may also include an output terminal connected to the power supply circuit 140. The OR circuit 130 may include two or more diodes connected between the respective input terminals and the output terminal. The second control power CP2 may also have, for example, a direct current voltage of 24 V.

In an implementation, the OR circuit 130 may include a first node N1 for outputting control power having a higher voltage level and a second node N2 to which the second external terminal T2 is connected. The power supply circuit 140 may be connected to the first node N1, and the first node N1 may be a node that outputs, to the power supply circuit 140, control power having a higher voltage level. The second node N2 may be a node that transmits, to the second external terminal T2, the first control power CP1 output from the DC/DC converter 120.

The OR circuit 130 may include a first diode D1 connected between the output terminal of the DC/DC converter 120 and the first node N1, and a second diode D2 connected between the first external terminal T1 and the first node N1. The first diode D1 may be connected between the output terminal of the DC/DC converter 120 and the second node N2. The OR circuit 130 may further include a fourth diode D4 connected between the second node N2 and the first node N1.

The first switch SW1 may be connected between the output terminal of the DC/DC converter 120 and the second external terminal T2. In an implementation, the first switch SW1 may be connected between the second node N2 and the second external terminal T2. In addition, a third diode D3 may be connected in series with the first switch SW1 between the second node N2 and the second external terminal T2.

The power supply circuit 140 may generate driving power by using control power received through the first node N1 of the OR circuit 130. In an implementation, the driving power may have a voltage of 5 V, a voltage of 3.3 V, and a voltage of 1.2 V. The power supply circuit 140 may include a DC/DC converter circuit that may convert a voltage of the control power into voltages of the driving power.

The control circuit 150 may be driven by the driving power supplied from the power supply circuit 140. The control circuit 150 may be referred to as a micro control unit (MCU), and for safe use of the battery pack 100, may manage the battery 110 and may control switches SW1, SW2, and SW3. The control circuit 150 may also control the DC/DC converter 120.

The control circuit 150 may monitor a state of the battery pack 100. For example, the control circuit 150 may detect a battery voltage of the battery 110, a cell voltage of each battery cell 111, a battery current, a temperature, and the like.

The control circuit 150 may detect a voltage level V1 of the first external terminal T1. The control circuit 150 may be configured to short-circuit the first switch SW1 so that the first control power CP1 generated by the DC/DC converter 120 may be supplied to the control device 30 of FIG. 1 through the second external terminal T2 in accordance with the voltage level V1 of the first external terminal T1 being less than a preset reference value. The preset reference value may be preset to a value for determining whether or not a power failure occurs. The control circuit 150 may determine that a power failure has occurred in accordance with the voltage level V1 of the first external terminal T1 being less than or equal to the preset reference value.

In the event of a power failure, the second control power CP2 is not received through the first external terminal T1. In an implementation, the first control power CP1 generated by the DC/DC converter 120 may be supplied to the power supply circuit 140 through the first diode D1 and the first node N1, and the power supply circuit 140 may generate the driving power for driving the control circuit 150 by using the first control power CP1. In addition, the first control power CP1 generated by the DC/DC converter 120 may also be supplied to the external control device 30 through the second node N2, the first switch SW1, the third diode D3, and the second external terminal T2. Accordingly, even in the event of a power failure, the control device 30 may receive power and perform an intended control operation.

In another implementation, the battery pack 100 may further include a shunt resistor 161 connected between the battery 100 and the second pack terminal P2, and an analog front end 160 for detecting the cell voltage of each battery cell 111 and a voltage at both ends of the shunt resistor 161 and transmitting the detected cell voltage and voltage to the control circuit 150. In a further implementation, the shunt resistor 161 may be connected between the battery 100 and the first pack terminal P1. The analog front end 160 may be driven by using the driving power generated by the power supply circuit 140. The battery pack 100 may further include a temperature sensor, and the analog front end 160 may detect a battery temperature and/or an ambient temperature through the temperature sensor and transmit the detected battery temperature and ambient temperature to the control circuit 150.

The battery pack 100 may further include the second switch SW2 connected between the cathode terminal B1 of the battery 110 and the first pack terminal P1, and the third switch SW3 connected between the anode terminal B2 of the battery 110 and the second pack terminal P2. The control circuit 150 may be configured to control the second switch SW2 and the third switch SW3 on the basis of at least one of the cell voltage of each battery cell 111 and the voltage at both ends of the shunt resistor 161.

In an implementation, the control circuit 150 may compare the cell voltage of each battery cell 111 with a preset overvoltage and low voltage reference value, and may turn on the second switch SW2 and the third switch SW3 in the event of an overvoltage or low voltage. The control circuit 150 may detect a charge/discharge current of the battery 110 on the basis of the voltage at both ends of the shunt resistor 161, and may compare the charge/discharge current with a preset overcurrent reference value. In the event of an overcurrent, the control circuit 150 may turn on the second switch SW2 and the third switch SW3.

The control circuit 150 may output first, second, and third control signals S1, S2, and S3 for controlling the first, second, and third switches SW1, SW2, and SW3, respectively.

A battery pack according to the disclosure may output control power for driving an internal electronic device. In an implementation, the battery pack may supply the control power to an external control device even without a separate UPS in the event of a power failure.

Certain embodiments illustrated and described herein are examples for the description and are not intended to limit the scope of the embodiments in any way. For brevity, the descriptions of existing electronic components, control systems, software, and other functional aspects of the above systems may be omitted. In addition, connections or connection units of lines between components shown in the drawings are examples of functional connections and/or physical or circuit connections, and may be implemented as various alternative or additional functional connections, physical connections, or circuit connections in actual devices. In addition, the connections or connection units are not considered essential components unless there are specific references such as "essential", "significantly", etc.

When describing embodiments (in particular, claims), the use of the term "the" and similar indicative terms may correspond to both singular and plural forms. In addition, when the range is described in the embodiments, it includes the disclosure applying individual values belonging to the range (unless there is a contrary description), and each individual value constituting the range is as described in the description of the disclosure. Finally, when there is no explicit or contrary description of operations constituting a method according to the disclosure, the operations may be performed in an appropriate order. The disclosure is not necessarily limited according to the order of description of the operations. In the disclosure, the use of all examples or example terms (e.g., etc.) is simply for describing the disclosure in detail, and the scope of the embodiments is not limited by the examples or the example terms unless limited by claims. In addition, one of ordinary skill in the art may understand that various modifications, combinations, and changes may be made according to design conditions and factors within the scope of appended claims or their equivalents.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack comprising:
   a battery including at least one battery cell;
   a direct current (DC)/DC converter configured to generate first control power from battery power of the battery;
   an OR circuit configured to output control power having a higher voltage level from among the first control power received from an output terminal of the DC/DC converter and second control power received from an external power supply device through a first external terminal of the battery pack;
   a power supply circuit configured to generate driving power by using the control power received from the OR circuit;
   a control circuit driven by the driving power; and
   a first switch connected between an output terminal of the DC/DC converter and a second external terminal of the battery pack, wherein the first switch is controlled by the control circuit.

2. The battery pack as claimed in claim 1, wherein the control circuit is further configured to detect a voltage level of the first external terminal and to short-circuit the first switch to output the first control power through the second external terminal in accordance with the voltage level of the first external terminal being less than or equal to a preset reference value.

3. The battery pack as claimed in claim 1, wherein the OR circuit includes:
   a first node configured to output the control power to the power supply circuit;
   a second node configured to transmit the first control power to the second external terminal through the first switch;
   a first diode connected between the output terminal of the DC/DC converter and the first node; and
   a second diode connected between the first external terminal and the first node.

4. The battery pack as claimed in claim 3, further comprising a third diode connected in series with the first switch between the second node and the second external terminal.

5. The battery pack as claimed in claim 3, wherein the OR circuit further includes a fourth diode connected between the second node and the first node.

6. The battery pack as claimed in claim 1, further comprising:

a shunt resistor connected between the battery and a second pack terminal of the battery pack, the shunt resistor having two ends; and an analog front end configured to detect a cell voltage of the at least one battery cell and a shunt resistor voltage at both ends of the shunt resistor and to transmit the detected cell voltage and the shunt resistor voltage to the control circuit.

7. The battery pack as claimed in claim 6, further comprising:
a second switch connected between a cathode of the battery and a first pack terminal of the battery pack; and
a third switch connected between an anode of the battery and the second pack terminal, wherein the control circuit is further configured to control the second switch and the third switch based on at least one from among the cell voltage of the at least one battery cell and the shunt resistor voltage.

8. A device, comprising:
a battery, a first external terminal, and a second external terminal;
a direct current (DC)/DC converter configured to generate first control power from battery power of the battery;
a first control circuit configured to output control power having a higher voltage level from among the first control power received from an output terminal of the DC/DC converter and second control power received via the first external terminal;
a power supply circuit configured to receive the control power output by the first control circuit and to generate driving power by using the control power;
a second control circuit driven by the driving power; and
a first switch connected between an output terminal of the DC/DC converter and the second external terminal.

9. The device as claimed in claim 8, wherein the second control power is received from an external power supply device.

10. The device as claimed in claim 8, wherein the first switch is controlled by the second control circuit.

11. The device as claimed in claim 8, wherein the second control circuit is further configured to detect a voltage level of the first external terminal and to short-circuit the first switch to output the first control power through the second external terminal in accordance with the voltage level of the first external terminal being less than or equal to a preset reference value.

12. The device as claimed in claim 11, wherein the second control circuit is configured to determine occurrence of a power failure, in accordance with the voltage level of the first external terminal being less than or equal to the preset reference value.

13. The device as claimed in claim 8, wherein the first control circuit includes:
a first node configured to output the control power to the power supply circuit;
a second node configured to transmit the first control power to the second external terminal through the first switch;
a first diode connected between the output terminal of the DC/DC converter and the first node; and
a second diode connected between the first external terminal and the first node.

14. The device as claimed in claim 8, further comprising:
a shunt resistor connected between the battery and a second pack terminal of the device, the shunt resistor having two ends; and
an analog front end configured to detect a cell voltage of a battery cell of the battery and a shunt resistor voltage at both ends of the shunt resistor and to transmit the detected cell voltage and the shunt resistor voltage to the second control circuit.

15. The device as claimed in claim 14, further comprising:
a second switch connected between a cathode of the battery and a first pack terminal of the device; and
a third switch connected between an anode of the battery and the second pack terminal, wherein the control circuit is further configured to control the second switch and the third switch based on at least one from among the cell voltage of the at least one battery cell and the shunt resistor voltage.

16. A device, comprising:
a battery, a first external terminal, and a second external terminal;
a direct current (DC)/DC converter configured to generate first control power from battery power of the battery;
a first control circuit configured to output control power having a higher voltage level from among the first control power received from an output terminal of the DC/DC converter and second control power received via the first external terminal;
a power supply circuit configured to receive the control power output by the first control circuit and to generate driving power by using the control power;
a second control circuit driven by the driving power; and
a plurality of switches controlled by the second control circuit, the plurality of switches including a first switch connected between an output terminal of the DC/DC converter and the second external terminal.

17. The device as claimed in claim 16, wherein the second control power is received from an external power supply device.

18. The device as claimed in claim 16, wherein the second control circuit is further configured to detect a voltage level of the first external terminal and to short-circuit the first switch to output the first control power through the second external terminal in accordance with the voltage level of the first external terminal being less than or equal to a preset reference value.

19. The device as claimed in claim 18, wherein the first control circuit includes:
a first node configured to output the control power to the power supply circuit;
a second node configured to transmit the first control power to the second external terminal through the first switch;
a first diode connected between the output terminal of the DC/DC converter and the first node; and
a second diode connected between the first external terminal and the first node.

* * * * *